(12) United States Patent
Henley

(10) Patent No.: US 6,824,124 B2
(45) Date of Patent: Nov. 30, 2004

(54) AERATOR AND MIXER

(75) Inventor: Bruce Hyndman Henley, Invercargill (NZ)

(73) Assignee: Henley Industries Limited, Invercargill (NZ)

(*) Notice: Subject to any disclaimer, the term of this patent is extended or adjusted under 35 U.S.C. 154(b) by 0 days.

(21) Appl. No.: 10/415,923

(22) PCT Filed: Nov. 5, 2001

(86) PCT No.: PCT/NZ01/00247
§ 371 (c)(1),
(2), (4) Date: May 5, 2003

(87) PCT Pub. No.: WO02/38510
PCT Pub. Date: May 16, 2002

(65) Prior Publication Data
US 2004/0017016 A1 Jan. 29, 2004

(30) Foreign Application Priority Data
Nov. 8, 2000 (NZ) .............................. 508044

(51) Int. Cl.$^7$ ................................ B01F 3/04
(52) U.S. Cl. ............ 261/28; 261/87; 210/220; 210/242.2
(58) Field of Search ................ 261/28, 29, 30, 261/87, 91, 93; 210/220, 242.2

(56) References Cited

U.S. PATENT DOCUMENTS

| 3,650,513 | A | * | 3/1972 | Werner | 261/87 |
| 4,066,722 | A | * | 1/1978 | Pietruszewski et al. | 261/87 |
| 4,117,044 | A | * | 9/1978 | Durda et al. | 261/30 |
| 4,280,911 | A | * | 7/1981 | Durda et al. | 210/629 |
| 4,741,825 | A | * | 5/1988 | Schiller | 210/170 |
| 4,774,031 | A | * | 9/1988 | Schurz | 261/87 |
| 5,744,072 | A | * | 4/1998 | Karliner | 261/87 |

* cited by examiner

Primary Examiner—Scott Bushey
(74) Attorney, Agent, or Firm—McCormick, Paulding & Huber LLP

(57) ABSTRACT

An aerator/mixer which includes a rotatable hollow drive shaft one or more air intake ports adjacent one end, and a propeller and an air permeable diffuser mounted adjacent to the other end; the diffuser is mounted below the propeller; and is in communication with the interior of the hollow drive shaft such that air supplied to the air intake port can exit only through the diffuser, the aerator/mixer further includes a device for rotating the drive shaft and the propeller and a device for supplying air at above atmospheric pressure to the or each air intake port.

16 Claims, 4 Drawing Sheets

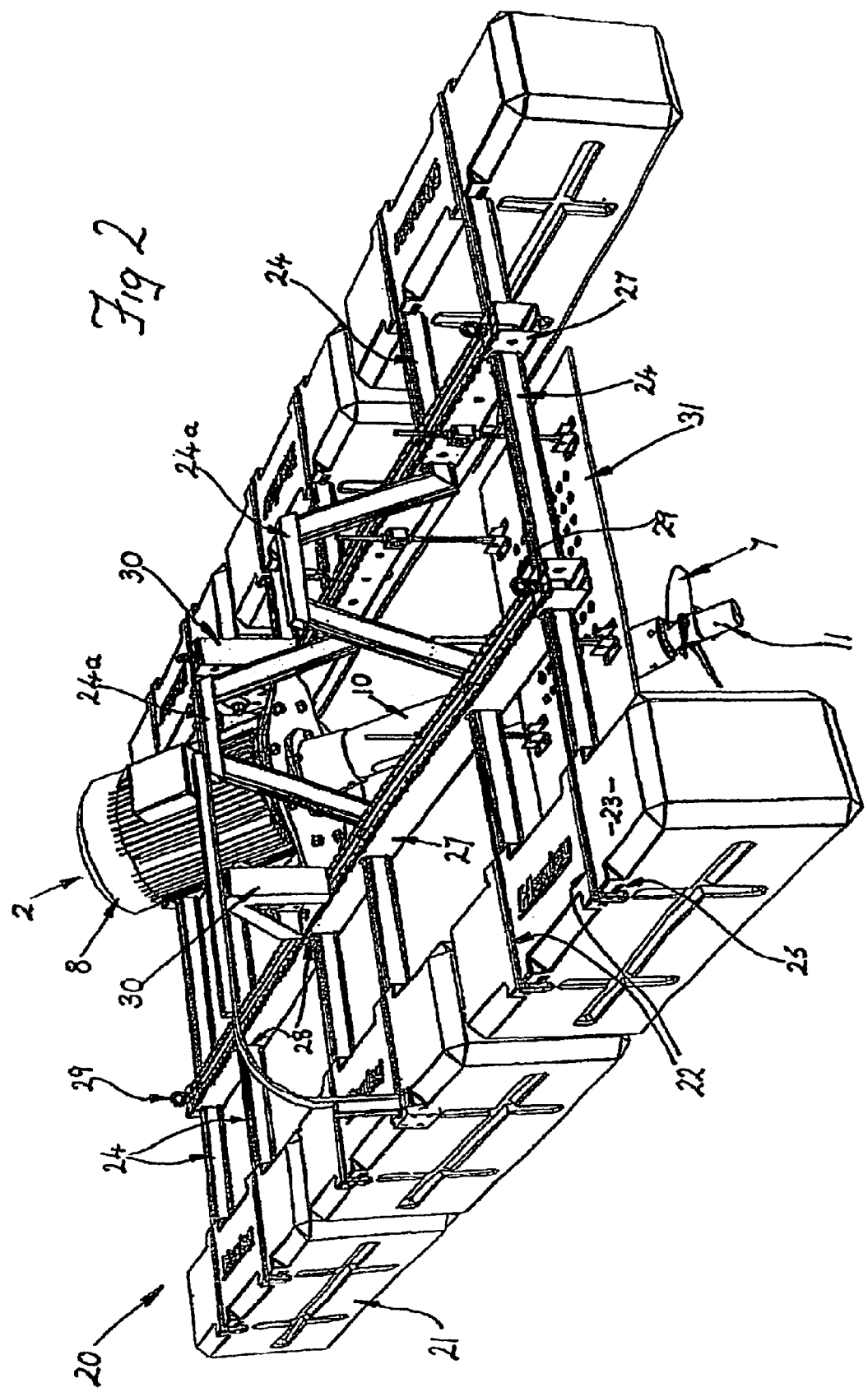

AERATOR AND MIXER

TECHNICAL FIELD

The present invention relates to an improved aerator and mixer. The device of the present invention has been designed especially for aeration and mixing of wastewater, and will be described with particular reference to this application. However, it will be appreciated that the device of the present invention could be used in a wide range of other applications where aeration and/or mixing are required.

BACKGROUND OF THE INVENTION

One known design of aerator/mixer in use at present consists of a rotatable hollow drive shaft with air intake ports at one end, open at the other end, and a propeller adjacent said other end. In use, the aerator/mixer is mounted with the propeller immersed In the wastewater or other liquid to be aerated/mixed, but with the air intake ports above the water line.

The drive shaft is rotated (e.g. by an electric motor) to drive the propeller. The rotation of the propeller mixes the liquid in which the propeller is immersed, and also induces a fluid flow across the lower, immersed, end of the drive shaft. This creates an area of reduced pressure at the lower end of the drive shaft, and hence a similar reduction of pressure at the air intake ports, drawing atmospheric air into the ports and down the shaft.

The air so drawn into the shaft is released as small air bubbles into the liquid flow pattern created by the propeller.

The object of aeration is to introduce oxygen into the wastewater, since oxygen is needed to promote the growth of aerobic micro-organisms which consume the biological nutrients in the waste. The more oxygen is introduced into the wastewater, the greater the rate of growth of the aerobic micro-organisms.

Henry's Law states that the amount of gas absorbed by a given volume of liquid at a given temperature is directly proportional to the pressure of the gas.

Thus, if the pressure of the air introduced into the wastewater at the lower end of the drive shaft can be increased, the amount of air absorbed by the wastewater will be increased proportionately.

OBJECT OF THE INVENTION

It is therefore an object of the present invention to provide an aerator/mixer which is capable of supplying air to the propeller at above atmospheric pressure, without in any way decreasing the efficiency of the mixing function of the propeller.

DISCLOSURE OF INVENTION

The present invention provides an aerator/mixer which includes: a rotatable hollow drive shaft with at least one air intake port at or adjacent one end thereof and a propeller mounted adjacent the other end thereof so as to be rotatable with the drive shaft; means for rotating the drive shaft and the propeller; means for supplying air at above atmospheric pressure to the or each said air intake port an air permeable diffuser mounted on said other end of the drive shaft, with the interior of the diffuser in communication with the interior of said hollow drive shaft such that air supplied to the or each said air Intake port can eat the other end of the drive shaft only through said diffuser; the propeller being further from said other end of the drive shaft than said diffuser.

Preferably, the drive shaft is formed with a plurality of spaced air intake ports.

The means for supplying air at above atmospheric pressure may be any suitable means, e.g. a fan, compressor or blower.

As used herein, the term "air permeable" includes any structure through which air can pass, e.g. a perforated plate or a porous material.

In a preferred embodiment of the invention the diffuser comprises a perforated plate. However, for some applications, it may be preferable to form the diffuser from a porous material.

The porous diffuser may be any suitable type of material capable of delivering bubbles of air of a predetermined size (e.g. stainless steel, ceramics). Porous stainless steel providing tortuous paths typically 20 micron average diameter has been found to be suitable for delivering air bubbles of an average diameter of 1.5 mm.

BRIEF DESCRIPTION OF THE DRAWINGS

By way of example only, preferred embodiment of the present invention are described in detail with reference to the accompanying drawings, in which:

FIG. 2 is an isometric view of a pontoon supporting the aerator/mixer of the present invention;

BEST MODE FOR CARRYING OUT THE INVENTION

Figure 1:
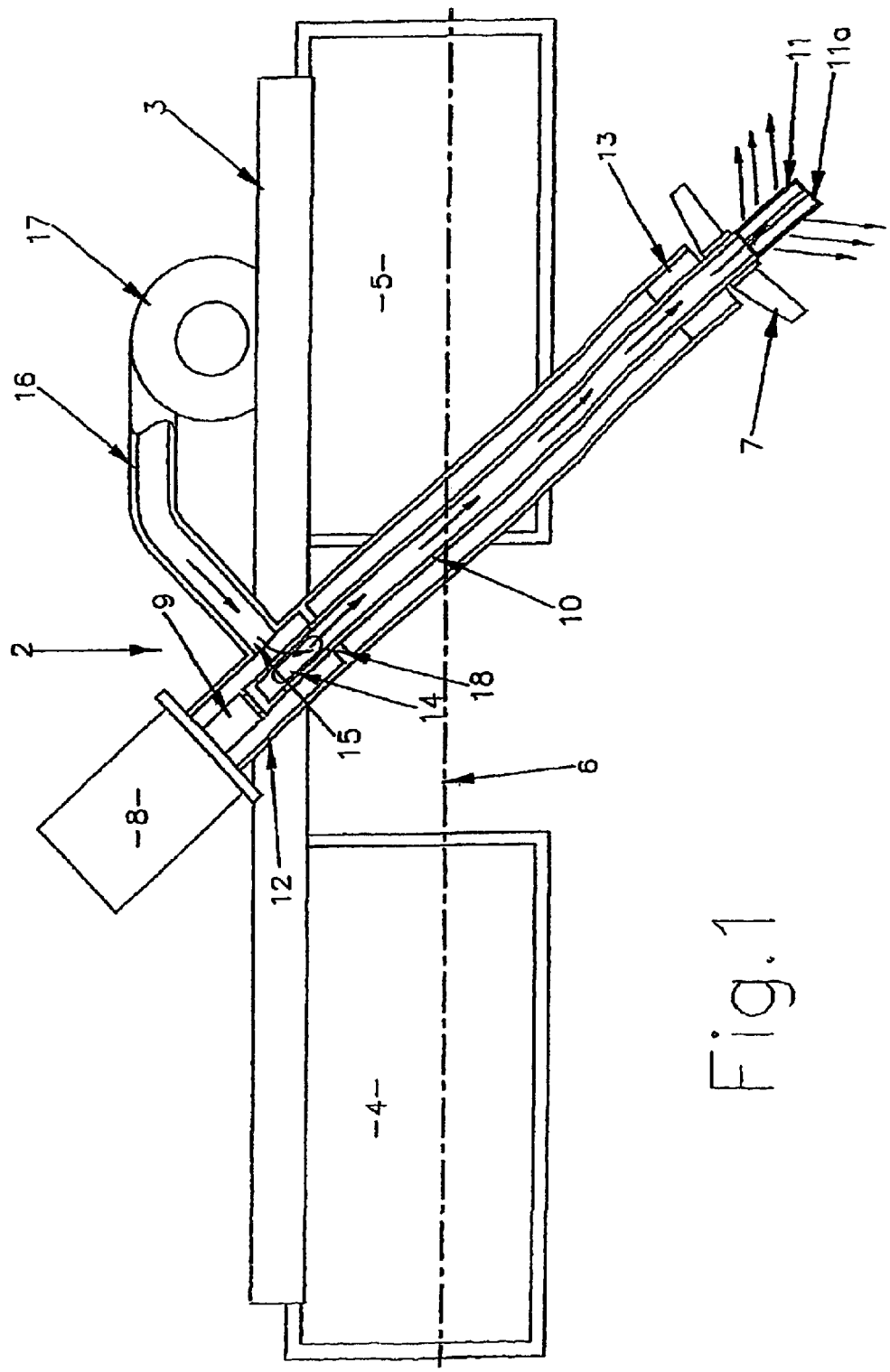
FIG. 1 is a diagrammatic longitudinal section through an aerator/mixer in accordance with the present invention.

Referring to FIG. 1 of the drawings, an aerator/mixer 2 is supported upon a platform 3 carried by pontoons 4,5. The pontoons 4,5 are shown only diagrammatically in FIG. 1. The pontoons 4,5 allow the aerator/mixer 2 to float on the surface of a lagoon or tank; the liquid level Is indicated by broken line 6. The aerator/mixer 2 is supported so that a propeller 7 adjacent the lower end of the aerator/mixer Is below the surface of the liquid, but the upper part of the aerator/mixer is well above the surface. It will be appreciated that the aerator/mixer may be supported by alternative known means, e.g. fixed mountings to bridges or walls.

The aerator/mixer 2 comprises an electric motor 8 which is coupled by a known flexible coupling assembly 9 to one end of a hollow drive shaft 10. The propeller 7 is mounted adjacent the other end of the drive shaft 10, to rotate wit the drive shaft. Immediately below the propeller 7, at the very end of the drive shaft 10, a diffuser 11 is mounted on, and rotates with, the drive shaft. The hollow interior of the drive shaft opens into the interior of the diffuser 11.

The drive shaft 10 is surrounded by a housing 12 which encloses the coupling 9 and all of the drive shaft up to the point Immediately above the propeller 7. The lower end of the housing 12 is sealed to the drive shaft by a bearing seal 13.

A series of six equidistantly spaced ports 14 (only one of which is visible) is formed around the circumference of the upper end of the drive shaft 10, just below the coupling assembly 9. Each of the ports 14 opens into the interior of the drive shaft 10. An inlet 15 is formed in the wall of the housing 12, aligned with the ports 14. A hose 16 is connected between the inlet 15 and an air blower 17 of known type, mounted on the platform 3. Any of a wide range of types of blower (or equivalent) may be used; typically, for an aerator having a propeller of . . . diameter, a suitable blower would be capable of delivering 500–600 cubic meters per hour of air, at a pressure of about 10 kpa.

It is important that all air supplied through the inlet 15 passes into the hollow drive shaft 10, and does not pass between the outer surface of the drive shaft 10 and the inner surface of the housing 12; to ensure this, a seal 18 is located between the interior wall of the housing 12 and the exterior wall of the drive shaft 10, just below the ports 14. Air passing down the outer surface of the drive shaft 10 would enter the liquid above the propeller 7, and this would tend to cause cavitation of the liquid and hence damage to the propeller surfaces.

The diffuser 11 comprises a cylinder the lower end 11a of which is dosed; the curved wall of the cylinder is perforated by a plurality of perforations (not shown) typically having a diameter in the range 1–5 mm. The end 11a of the diffuser is dosed and unperforated to ensure that air must leave the diffuser perpendicular to the axis of the drive shaft 10.

The above described aerator/mixer operates as follows: the aerator/mixer is suspended with the propeller 7 immersed in the liquid to be aerated/mixed, but with the ports 14 well clear of the liquid. The electric motor 8 is operated to rotate the drive shaft 10 and hence the propeller 7, mixing the liquid. The mixing by itself provides a certain amount of aeration, but aeration is optimized by supplying pressurized air from the blower 17 through the hose 16 and into the ports 14. The air then travels down the hollow interior of the drive shaft 10 into the diffuser 11, which Is rotated with the propeller but lies below the propeller.

It will be appreciated that the air bubbles from the diffuser 11 enter the liquid below the propeller 7, and thus do not cause cavitation of the liquid. The propeller 7 disperses the oxygen in the liquid around the lagoon or tank.

Simply supplying additional pressurized air to the aerator does not provide efficient aeration: the pressurized air would tend to enter the liquid in large bubbles which are not effective aerators. The purpose of the diffuser 11 is to reduce the size of the bubbles being introduced into the liquid so as to optimize aeration by maximizing the surface area of the bubbles, which in turn maximizes the oxygen/liquid interface. The diffuser utilizes shear as the means of minimizing bubble size and therefore maximizing total bubble surface area. The perforations on the diffuser are located only on the curved surface to maximize shear, since this ensures that all of the air must leave the diffuser perpendicular to the drive shaft axis. The air stream is thus exposed to two forms of shear: first, radial shear created by the drive shaft rotation, and second, linear shear from the water stream, created by the thrust from the propeller which is parallel to the drive shaft axis.

It will be appreciated that the perforation size and spacing of the diffuser can be altered to suit different aerator sizes and blower capacities. If a porous diffuser is substituted for a perforated plate diffuser, then similar variations can be achieved by varying the diameter, length and path size of the pores in the porous diffuser.

The above described aerator may be supported from any of a range of known floats or pontoons or by means of a fixed support. Preferably, however, the aerator is supported from a pontoon of the general design shown in FIGS. 2–4.

Referring in particular to FIG. 2, a pontoon 20 in accordance with the present invention consists of six floats 21 arranged in opposed pairs. In two parallel rows of three.

Each float 21 consists of an outer shell made of tough, impact resistant plastics material (e.g. high-density polyethylene) filled with a core of dosed cell foamed plastics material (e.g. polyurethane foam).

Each float 21 is substantially cuboid in shape and is formed with two parallel channels 22 across the width of the float, just below the upper surface 23.

The floats of each opposed pair are connected together by pairs of parallel cross members 24 which extend at right angles to the length of the floats; each end of each cross member 24 is slotted through one of the channels 22 and is retained in place by a through pin 25 which extends through a hole formed in the end of the cross member.

The cross members 24a which extend across the top of the drive shaft 10 of the aerator/mixer 2 (parts of which are omitted in this figure for clarity) are arched across their centre sections so that the lower portion of the aerator/mixer can be pivoted from the inclined operating position shown in FIG. 2 to a position in which the drive shaft lies in a substantially horizontal plane (i.e. on top of the float) so as to be accessible for maintenance purposes.

The cross members 24/24a and hence the attached floats 21 are secured together in two parallel rows by means of beams 27. Each cross member 24/24a is slotted through holes 28 in the beams 27, and is prevented from sliding relative to the beams 27 by securing pins 29 (only some of which are shown) which extend through corresponding apertures formed in the beams 27 and the cross members 24/24a.

Preferably, the cross members 24/24a and the beams 27 are made of a tough, lightweight corrosion resistant material such as aluminium.

Figure 2A:
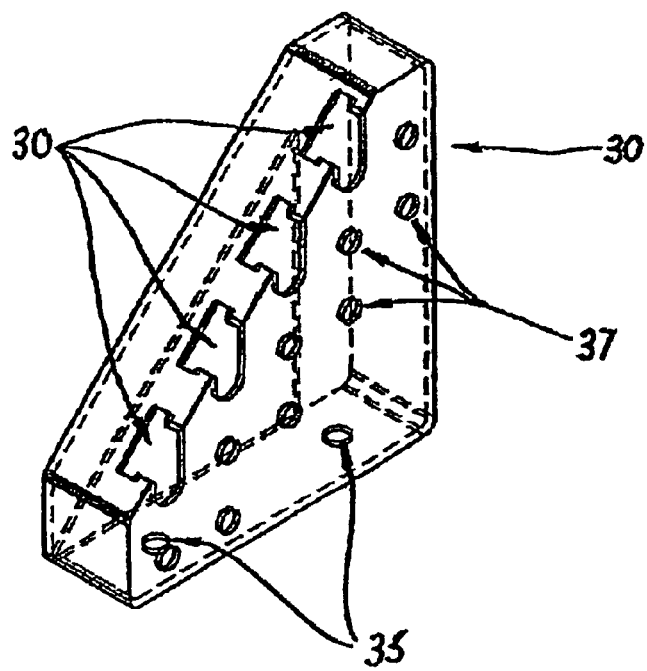
FIG. 2a is an isometric view of a detail of FIG. 2.

The aerator/mixer 2 is supported upon the pontoon 20 by a pair of brackets 30, which are shown on an enlarged scale in FIG. 2a. Each bracket 30 is securable to the underlying beam 27 at any of a range of positions along the length of the beam by means of bolts extending through holes 35 in the base of the bracket, into corresponding holes formed at Intervals along the length of the beam 27.

Each bracket 30 is substantially triangular in side view, with the hypotenuse of the triangle formed with a series of four slots 36 down the length of that side of the bracket. The brackets are secured to the beams 27 opposite each other, and the aerator/mixer 2 is supported by engaging a pair of opposed flanged pins formed on opposite sides of the electric motor housing into one pair of opposed slots 36. Thus, the height and angle of the aerator/mixer can be adjusted by selecting the appropriate pair of slots 36. The aerator/mixer is secured in position by passing bolts through any of the appropriate holes 37 formed in the walls of the bracket.

If the aerator/mixer 2 needs to be pivoted to a horizontal or near horizontal position for maintenance, the bolts are removed from the holes 37 and the aerator/mixer is simply pivoted on the slots 36 to the required position and is secured in this position by placing bolts In corresponding holes 37.

The combination of the range of positions of the brackets 30 and the fact that each pair of brackets offers a selection of four different positions, means that the aerator/mixer can be rapidly and easily adjusted to compensate for different sizes of aerator mixers and for different loadings on the pontoon, so that the aerator/mixer is always at an optimum position relative to the surface of the liquid. It is essential for efficient operation that the aerator/mixer is fully submerged in operation: the movement of the propeller of the aerator/mixer tends to lift the front of the pontoon, and the position of the aerator/mixer relative to the pontoon must be adjusted to compensate for this so that the pontoon lies substantially flat on the surface of the liquid, with the drive shaft 10 of the aerator/mixer at about 45 degrees to the surface. In addition, it may be necessary to adjust the position of the aerator/mixer relative to the pontoon to compensate for additional loading on the pontoon, e.g. the addition of a walkway or of additional equipment.

A vortex shield 31 is rigidly suspended from the cross members 24/24a in a plane substantially parallel to the plane of the liquid surface, below the liquid surface. The vortex shield 31 is a flat perforated plate and is suspended directly above the propeller 7 of the aerator/mixer. The vortex shield 31 prevents a vortex from forming in the liquid above the propeller 7 and thus inhibits cavitation In the liquid, which would damage the propeller. It is important that the vortex shield is rigidly suspended, so that it cannot rise above the water surface, since this would allow the propeller vortex to draw air downwards, causing cavitation around the propeller.

Figure 3:
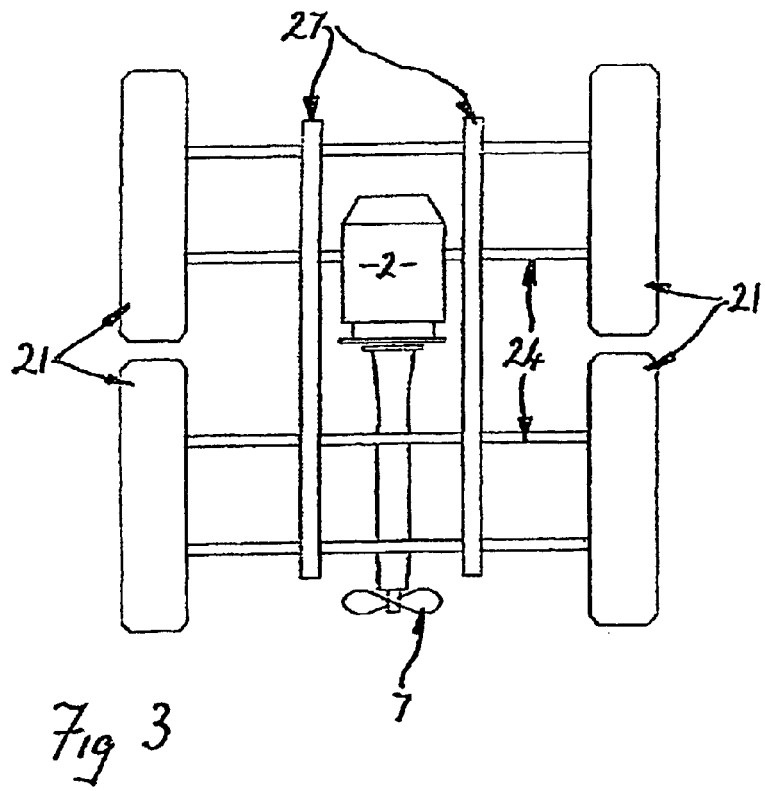
FIG. 3 is a plan view of a second pontoon layout.

FIG. 3 shows a variant of the design of FIG. 2, using only two pairs of floats 21, secured together in the same manner as described with reference to FIG. 2.

Figure 4:
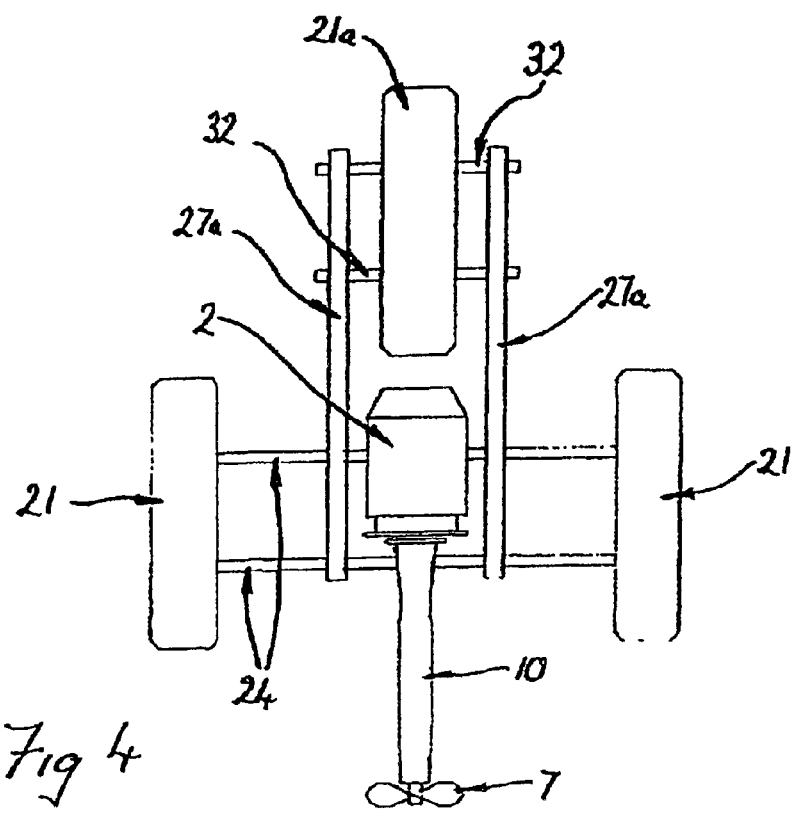
FIG. 4 is a plan view of a third pontoon layout.

FIG. 4 shows a further variant using one pair of floats 21 secured together as an opposed pair using cross members 24, with a third float 21a secured behind the pair of floats, so that all three floats lie in a triangular configuration in plan. A pair of beams 27a extend between the cross members 24 and are secured there as described with reference to FIG. 2. However, the beams 27 also extend to the rear of the floats 21 to support a pair of short cross members 32 which are secured to the float 21a.

The above described pontoon structure gives an exceptionally stable and versatile pontoon: larger or smaller pontoons of a variety of configurations can be assembled quickly and easily due to the easily released connection between the cross members 24 and the floats 21, and between the cross members 24 and the beams 27.

What is claimed is:

1. An aerator/mixer which includes: a rotatable hollow drive shaft with at least one air intake port at or adjacent one end thereof and a propeller mounted adjacent the other end thereof so as to be rotatable with the drive shaft; means for rotating the drive shaft and the propeller; means for supplying air at above atmospheric pressure to the or each said air intake port; an air permeable diffuser mounted on said other end of the drive shaft, with the interior of the diffuser in communication with the interior of said hollow drive shaft such that air supplied to the or each said air intake port can exit the other end of the drive shaft only through said diffuser, which is closed at its lower end, such that air can leave the diffuser only through the side wall or walls thereof; the propeller being further from said other end of the drive shaft than said diffuser.

2. The aerator/mixer as claimed in claim 1 wherein said drive shaft is formed with a plurality of air intake ports spaced around the circumference of the drive shaft.

3. The aerator/mixer as claimed in claim 1 wherein said means for supplying air at above atmospheric pressure comprises a blower.

4. The aerator/mixer as claimed in claim 1 wherein said diffuser comprises a substantially cylindrical perforated plate.

5. The aerator/mixer as claimed in claim 1 wherein said diffuser comprises a section of porous metal.

6. The aerator/mixer as claimed in claim 1 wherein the means for rotating the drive shaft and the propeller comprises an electric motor mounted adjacent said one end of said drive shaft and connected thereto by a flexible coupling.

7. The combination of the aerator/mixer as claimed in claim 1 and a pontoon which includes three or more floats secured together to form a supporting structure adapted to support the aerator/mixer at an acute angle to the plane of the surface of the liquid to be aerated/mixed, with said one end of the aerator/mixer supported clear of the liquid.

8. The combination as claimed in claim 7 wherein said floats are releasably secured together.

9. The combination as claimed in claim 8, wherein said floats are releasably secured together by means of cross members passing through channels formed in said floats.

10. The combination as claimed in claim 9 wherein the cross members are releasably secured together by means of one or more pairs of beams.

11. The combination as claimed in claim 10 wherein said pontoon consists of an even number of floats greater than two, arranged in opposed pairs in two parallel rows, with the floats of each opposed pair releasably secured together by one of said cross members; said beams extending parallel to said rows of floats, and the aerator/mixer being supported upon the pontoon between said beams.

12. The combination as claimed in claim 11 wherein the aerator/mixer is supported upon the pontoon by means of a pair of opposed brackets, each bracket being releasably mounted upon one of said beams.

13. The combination as claimed in claim 12 wherein each bracket provides a plurality of mounting positions for said aerator/mixer and the corresponding beam provides plurality of mounting positions for the bracket along the length of the beam.

14. The combination as claimed in claim 11, wherein said pontoon also includes a vortex plate secured between said rows in a plane parallel to the plane of the surface of the liquid and below the surface of the liquid, immediately above the propeller.

15. The combination as claimed in claim 7, wherein said pontoon consists of three floats secured together in a regular triangular configuration.

16. The combination as claimed in claim 7, wherein each float consists of a shell of a tough impact resistant plastics material filled with a core of foamed plastics material.

* * * * *